United States Patent [19]

Trottier

[11] Patent Number: 5,141,017

[45] Date of Patent: Aug. 25, 1992

[54] RECREATIONAL VEHICLE SEWAGE REMOVAL ADAPTER WITH BACK-FLUSHING CAPABILITY

[76] Inventor: Ben Trottier, P.O. Box 34, Castaic, Calif. 91310

[21] Appl. No.: 765,783

[22] Filed: Sep. 26, 1991

[51] Int. Cl.⁵ ............................................. F16L 45/00
[52] U.S. Cl. .............................. 137/240; 137/355.16; 137/899
[58] Field of Search ............... 137/240, 355.16, 899, 137/351; 251/151

[56] References Cited

U.S. PATENT DOCUMENTS

| | | | |
|---|---|---|---|
| 2,293,796 | 8/1942 | Bestor | 137/899 X |
| 3,656,711 | 4/1972 | Toelke | 251/151 |
| 3,712,331 | 1/1973 | Otto | 137/355.16 |
| 3,811,462 | 5/1974 | Feliz | 137/240 |
| 4,133,347 | 1/1979 | Mercer | 137/240 |
| 4,844,121 | 7/1989 | Duke | 137/355.16 X |
| 4,846,212 | 7/1989 | Scobie et al. | 137/240 |
| 4,854,349 | 8/1989 | Foreman | 137/355.16 X |

*Primary Examiner*—Stephen M. Hepperle
*Attorney, Agent, or Firm*—John J. Posta, Jr.

[57] ABSTRACT

An improved sewage removal adapter for connection between the main dump outlet connection of a recreational vehicle and a flexible holding tank drain hose is disclosed which includes the capacity to direct a back-flushing stream of water back into the holding tank dump tubes to clear any blockages existing in the dump tubes. The sewage removal adapter is connected to the recreational vehicle and to the flexible holding tank drain hose as is conventional, and also to a water source via a garden hose. The application of a high velocity back-flushing jet of water into the main dump outlet connection is controlled as needed by a valve built into the sewage removal adapter. Following the draining of the recreational vehicle holding tanks, the sewage removal adapter may also be used to flush the waste water dump tubes out.

18 Claims, 2 Drawing Sheets

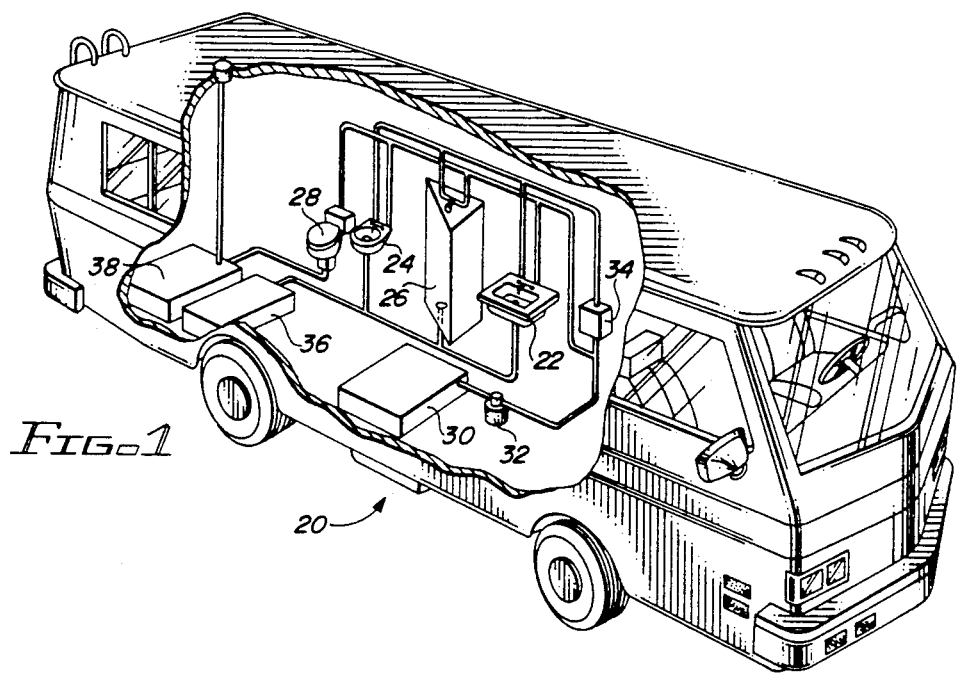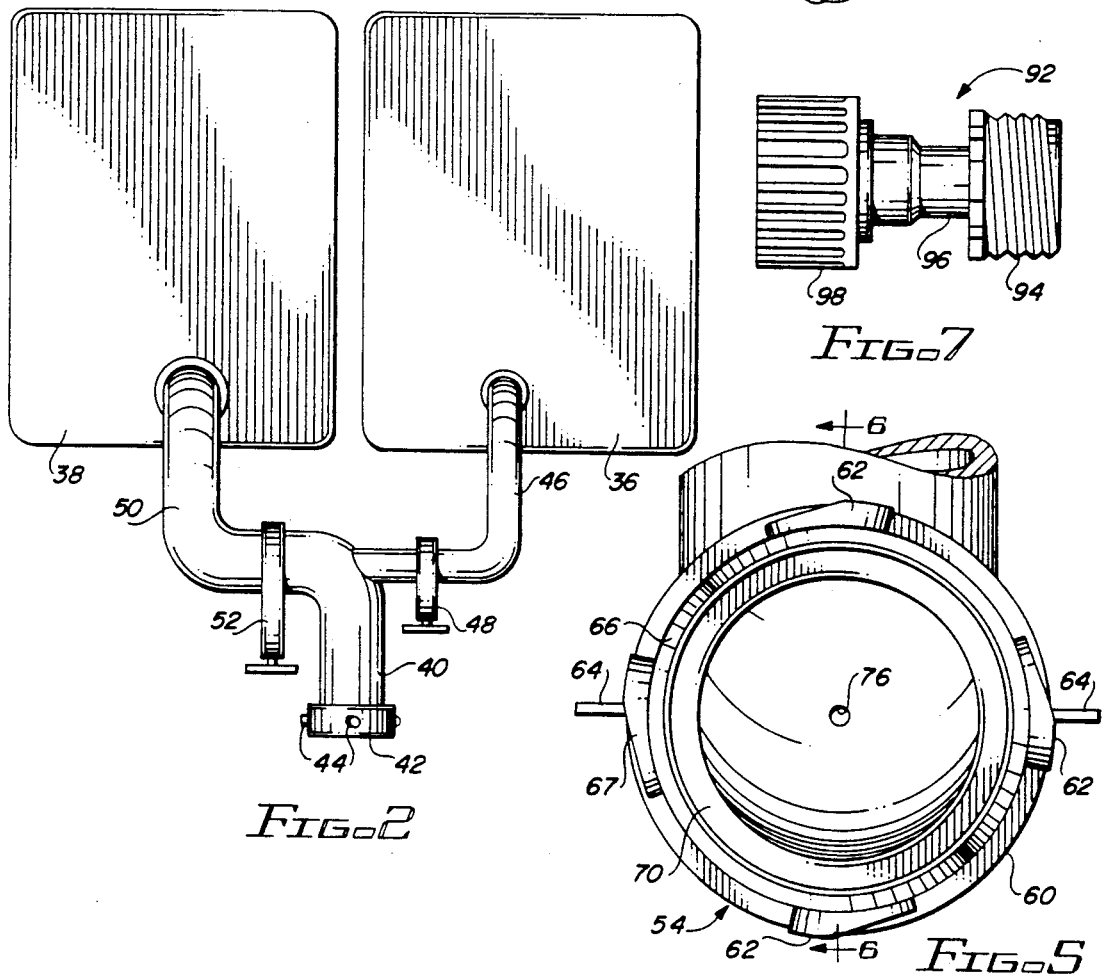

RECREATIONAL VEHICLE SEWAGE REMOVAL ADAPTER WITH BACK-FLUSHING CAPABILITY

BACKGROUND OF THE INVENTION

Field of the Invention

The present invention relates generally to an apparatus for facilitating the drainage of the waste water holding tanks in a recreational vehicle, and more particularly to an improved sewage removal adapter which includes the capacity to direct a back-flushing stream of water back into the holding tank dump tubes to clear any blockages existing in the dump tubes, as well as to flush the dump tubes out.

More and more people are enjoying the use of recreational vehicles today. The term "recreational vehicle," commonly abbreviated as "RV," is an all-encompassing term used to describe the variety of motorhomes, travel trailers, and campers present on highways today. In these recreational vehicles, users generally attempt to take many of the comforts of home with them to anywhere the open road leads to. One of these comforts is the comfort of indoor plumbing, which can (and typically does) include everything from a sink, to a bathtub or a shower, to a toilet.

In all but the smallest of recreational vehicles indoor plumbing is indeed found. Most larger recreational vehicles have the entire spectrum of plumbed facilities, often including two sinks, a toilet, and a combination bath/shower. The design of the plumbing system of a recreational vehicle is much more complex than the plumbing in a typical home, since the recreational vehicle must include holding tanks both to store fresh water in, and to store waste water in.

Waste water is of two different types: gray-water, which is waste water from sinks and showers or baths, and black-water, which is wastes from the toilet. In most recreational vehicles, gray-water and black-water are stored in two different holding tanks. These gray-water and black-water holding tanks must of course be drained periodically, and most recreational vehicle areas include dump stations into which the gray-water and black-water holding tanks may be drained.

A typical recreational vehicle has a three inch dump tube from the black-water holding tank connected to one side of a three inch dump valve, the other side of which is connected to the main dump outlet connection. A one and one-half inch dump tube from the gray-water holding tank is connected to one side of a one and one-half inch dump valve, the other side of which is also connected to the main dump outlet connection. The main dump outlet connection has an annular outlet connector with pins extending from the outer diameter thereof to facilitate attachment of a sewage removal adapter connected to one end of a flexible holding tank drain hose, the other end of which is connected to a dump station inlet.

While drainage of the gray-water holding tanks is typically uneventful, drainage of the black-water holding tank is frequently difficult. Since the black-water holding tank contains solid as well as liquid waste from the toilet, it is not uncommon for the dump tube, the slider valve, or the main dump outlet connection to become blocked. Blockages of the dump line from the gray-water holding tank may occasionally occur, but by far the most common blockage is in the dump line from the black-water holding tank, particularly a blockage in the black-water slider valve.

Blockage in the dump line from the black-water holding tank can occur when the black-water holding tank is less than three-fourths full before dumping. Sometimes such blockages can be cleared by filling the black-water holding tank and using the increased pressure to clear the blockage. If this tactic is unsuccessful, the alternative is to attempt to clear the blockage manually, which is not a particularly pleasant job.

It is accordingly the primary objective of the present invention that it provide a mechanism for easily and conveniently clearing a blockage in the dump lines from the gray-water and black-water holding tanks. It is a further objective of the present invention that it operate without necessitating either the refilling of the holding tanks, or the removal of the sewage removal adapter from the main dump outlet connection, to clear a blockage in the dump lines. It is a still further objective of the present invention that it be simple to use, and that it be operable by a single individual, without requiring any special skill or substantial muscle strength to operate it.

The present invention should be of durable and long-lasting construction, and must require little or no maintenance to be provided by the user. It is also an objective that the present invention be of inexpensive construction to allow it to be easily affordable to all recreational vehicle users, including those such as older people who may be on a fixed income. Finally, it is also an objective that all of the aforesaid advantages and objectives of the present invention be achieved without incurring any substantial relative disadvantage.

SUMMARY OF THE INVENTION

The disadvantages and limitations of the background art discussed above are overcome by the present invention. With this invention, an improved sewage removal adapter is utilized to connect a flexible holding tank drain hose to the main dump outlet connection on a recreational vehicle. The sewage removal adapter of the present invention thus has provision on its proximal end to connect to a flexible holding tank drain hose, and an annular connector on its distal end for attachment to the annular outlet connector with pins located on the main dump outlet connection, both of which arrangements are conventional in the art.

The portion of the sewage removal adapter intermediate the proximal and distal ends thereof is in the preferred embodiment curved. Mounted on the outer side of the proximal portion of the curve is a protuberance housing a reduced diameter venturi. The reduced diameter venturi has a larger proximal end located in the interior of the protuberance, and a smaller distal end which is in fluid communication with the interior of the intermediate portion of the sewage removal adapter intermediate the proximal and distal ends thereof.

The proximal end of the reduced diameter venturi is connected to one side of a back-flush valve, the other side of which back-flush valve is connected to a connector for ultimate connection to a water source. In its simplest form, the preferred embodiment of this connector is simply a female threaded portion which may be connected to the distal end of a garden hose, the proximal end of which is connected to a water source. In a slightly more complex form, this connector may include a swivel fitting intermediate the back-flush valve and a female threaded portion for connection to the distal end of a garden hose.

Water supplied to the device through the back-flush valve will be supplied to the larger proximal end of the reduced diameter venturi. The reduced diameter venturi serves to greatly increase the velocity of water flowing under pressure from the smaller distal end thereof into the interior of the sewage removal adapter. The reduced diameter venturi is located within the protuberance so that fluid exiting the reduced diameter venturi from the smaller distal end thereof will be directed approximately toward the center of the annular connector on the distal end of the sewage removal adapter.

Thus, when water is supplied to the sewage removal adapter of the present invention, and the back-flush valve is turned on, water flowing at a high velocity will be directed approximately into the center of the main dump outlet connection on the recreational vehicle. Depending on which slider valve is open, the high velocity stream of water from the sewage removal adapter of the present invention will enter one of the dump tubes. If the black-water slider valve is open, the high velocity stream of water will operate to swiftly clear a blockage in the main dump outlet connection, in the black-water slider valve, or in the black-water dump tube from the black-water holding tank.

It may therefore be seen that the present invention teaches a sewage removal adapter for easily and conveniently clearing a blockage in the dump lines from the gray-water and black-water holding tanks. The sewage removal adapter of the present invention operates without necessitating either the refilling of the waste water holding tanks, or the removal of the sewage removal adapter from the main dump outlet connection, to clear a blockage in the waste water dump lines. The sewage removal adapter of the present invention is simple to use, and its back-flushing feature is operable by a single individual, without requiring any special skill or substantial muscle strength to operate it.

The sewage removal adapter of the present invention is of durable and long-lasting construction, and requires virtually no maintenance to be provided by the user. The sewage removal adapter of the present invention is of inexpensive construction to allow it to be easily affordable to all recreational vehicle users, including those such as older people who may be on a fixed income. Finally, all of the aforesaid advantages and objectives of the sewage removal adapter of the present invention are achieved without incurring any substantial relative disadvantage.

DESCRIPTION OF THE DRAWINGS

These and other advantages of the present invention are best understood with reference to the drawings, in which:

FIG. 1 is a somewhat schematic cutaway perspective view of a motorhome recreational vehicle, showing the vehicle's self-contained plumbing system, including the gray-water holding tank and the black-water holding tank;

FIG. 2 is a somewhat schematic bottom view of the gray-water holding tank and the black-water holding tank of the recreational vehicle shown in FIG. 1, showing the dump tubes and the slider valves located between the gray-water and black-water holding tanks and the main dump outlet connection;

FIG. 5 is a top view of a portion of the sewage removal adapter illustrated in FIGS. 3 and 4 with a sealing gasket removed for clarity, showing the annular connector from its top or distal end;

FIG. 7 is a side view of the swivel fitting used with the sewage removal adapter as illustrated in FIGS. 3 and 4.

DETAILED DESCRIPTION OF THE PREFERRED EMBODIMENT

Figure 3:
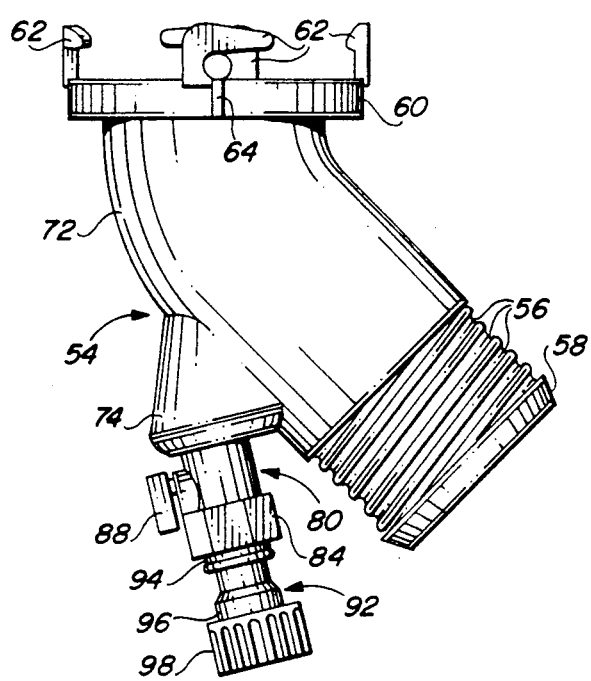
FIG. 3 is a side view of the sewage removal adapter of the present invention, showing the provision on its proximal end to connect to a flexible holding tank drain hose, the annular connector on its distal end, the protuberance housing the reduced diameter venturi, the back-flush valve, and a swivel fitting.

The preferred embodiment of the sewage removal adapter of the present invention is designed to be useable with any standard recreational vehicle holding tank sanitation system. Prior to discussing the construction of the sewage removal adapter of the present invention, it is helpful to discuss the construction and operation of such a standard recreational vehicle waste water holding tank sanitation system. Referring first to FIG. 1, a motorhome recreational vehicle 20 is illustrated which has a galley sink 22, a bathroom sink 24, a shower 26, and a toilet 28.

The motorhome recreational vehicle 20 has a storage of fresh water in a fresh water holding tank 30, which is supplied by a water pump 32 to a hot water heater 34, and to the galley sink 22, the bathroom sink 24, the shower 26, and the toilet 28. Hot water provided by the hot water heater 34 is supplied to the galley sink 22, the bathroom sink 24, and the shower 26.

Waste water from the galley sink 22, the bathroom sink 24, and the shower 26 is routed into a gray-water holding tank 36. Waste from the toilet 28 is routed into a black-water holding tank 38. Thus, in the motorhome recreational vehicle 20, storage of gray-water is maintained in the gray-water holding tank 36, and storage of black-water is maintained in the black-water holding tank 38.

Referring next to FIG. 2, the fluid connection between the gray-water holding tank 36 and the black-water holding tank 38 and a main dump outlet connection 40 is illustrated. The main dump outlet connection 40 is more or less conventional in recreational vehicles, and includes an annular outlet connector 42 with outwardly-projecting pins 44 located around the outer circumference thereof. When neither the gray-water holding tank 36 nor the black-water holding tank 38 is being drained, the annular outlet connector 42 is normally covered by a plastic cap (not shown).

A gray-water dump tube 46 is connected at one end thereof to the gray-water holding tank 36, typically on the bottom of the gray-water holding tank 36. The gray-water dump tube 46 is typically one and one-half inches in diameter. The other end of the gray-water dump tube 46 is connected to one side of a gray-water slider valve 48, the other side of which gray-water slider valve 48 is connected to the main dump outlet connection 40.

A black-water dump tube 50 is connected at one end thereof to the black-water holding tank 38, again typically on the bottom of the black-water holding tank 38. The black-water dump tube 50 is typically three inches in diameter. The other end of the black-water dump tube 50 is connected to one side of a black-water slider valve 52, the other side of which black-water slider valve 52 is connected to the main dump outlet connection 40.

To drain either the gray-water holding tank 36 or the black-water holding tank 38, or both, the plastic cap (not shown) is removed from the annular outlet connector 42. A conventional sewage removal adapter (not shown) connected to one end of a flexible holding tank drain hose (also not shown) is connected to the annular outlet connector 42, and the free end of the flexible holding tank drain hose is connected to a dump station inlet (not shown).

The gray-water slider valve 48 may be opened to drain the gray-water holding tank 36, and the black-water slider valve 52 may be opened to drain the black-water holding tank 38. No provision is made in this construction, either in the recreational vehicle itself, or in the conventional sewage removal adapter and the flexible holding tank drain hose, for the removal of a blockage in the waste water dump lines. This completes the preliminary discussion of the construction of a typical recreational vehicle waste water holding tank drainage system.

Referring now generally to FIGS. 3 through 6, a sewage removal adapter 54 constructed according to the teachings of the present invention is illustrated. One end of the sewage removal adapter 54 is adapted to be attached to a flexible holding tank drain hose (not shown), while the other end of the sewage removal adapter 54 is adapted to be removably connected to the annular outlet connector 42 of the main dump outlet connection 40 (FIG. 2). The end of the sewage removal adapter 54 for attachment to a flexible holding tank drain hose shall be referred to as the proximal end of the sewage removal adapter 54, while the end of the sewage removal adapter 54 for connection to the annular outlet connector 42 of the main dump outlet connection 40 shall be referred to as the distal end of the sewage removal adapter 54.

The proximal end of the sewage removal adapter 54 is cylindrical and has threads 56 located on the outer diameter thereof near the proximal end. The far proximal end of the sewage removal adapter 54 has an inwardly tapered portion 58 located on the outer surface thereof. The proximal end of the sewage removal adapter 54 is thus designed for threading into the interior of a flexible holding tank drain hose (not shown), which would typically be of a three inch diameter. The proximal end of the sewage removal adapter 54 could alternatively have a smooth outer surface instead of the threads 56, with a hose clamp being used to maintain a flexible holding tank drain hose on the proximal end of the sewage removal adapter 54.

The distal end of the sewage removal adapter 54 has an annular connector 60 mounted thereon. The annular connector 60 has four hooks 62 extending from the top or distal side of the annular connector 60 which hooks 62 are spaced at ninety degree intervals. The hooks 62 are designed for engagement with the pins 44 on the annular outlet connector 42 of the main dump outlet connection 40 (FIG. 2) when the annular connector 60 is placed against the annular outlet connector 42 of the main dump outlet connection 40 and turned in a clockwise manner.

The hooks 62 are designed to draw the annular connector 60 into closer engagement with the annular outlet connector 42 of the main dump outlet connection 40 as the sewage removal adapter 54 is rotated with respect to the annular outlet connector 42 of the main dump outlet connection 40. Two tabs 64 extend outwardly from opposite sides of the annular connector 60 to provide surfaces to use to facilitate connection of the sewage removal adapter 54 to (or removal of it from) the annular outlet connector 42 of the main dump outlet connection 40.

Figure 6:
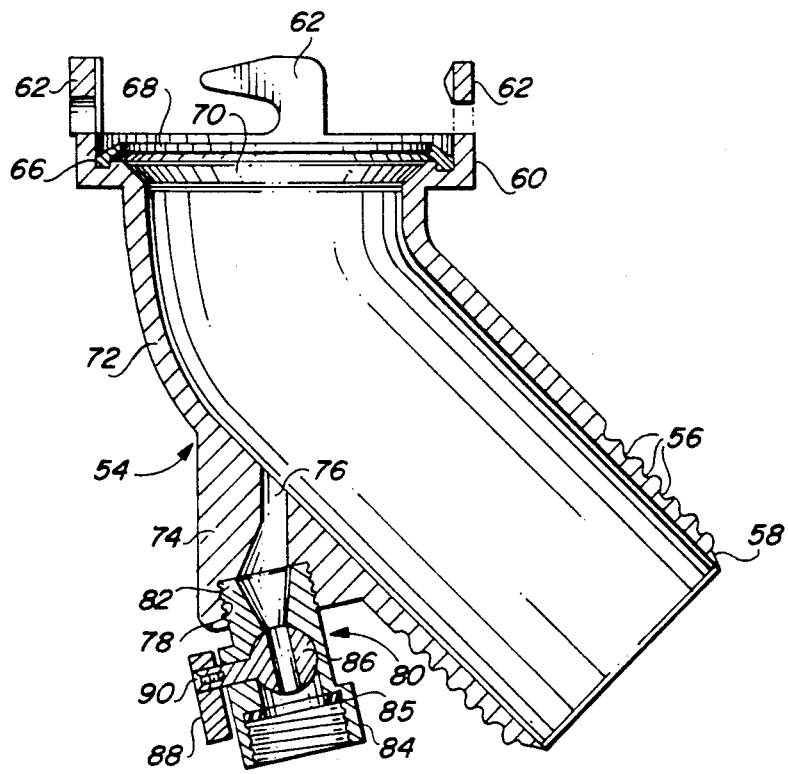
FIG. 6 is a cross-sectional view of the sewage removal adapter illustrated in FIGS. 3 through 5 with the swivel fitting removed for clarity, showing the reduced diameter venturi located inside the protuberance, the operational portion of the back-flush valve, and the location and configuration of the sealing gasket.

The interior of the annular connector 60 is best shown in FIGS. 5 and 6. Located inside the interior of the annular connector 60 is a cylindrical groove 66 which is for use in mounting an elastomeric gasket 68 (removed for clarity in FIG. 5) therein. Located radially inwardly from the cylindrical groove 66 in the annular connector 60 is a frustroconical interior segment 70. The elastomeric gasket 68 is made of an elastomeric material such as silicone rubber, and has an angular cross-section at approximately 135 degrees, as shown in FIG. 6.

Located intermediate the annular connector 60 and the portion of the proximal end of the sewage removal adapter 54 used for attachment of a flexible holding tank drain hose (not shown) is a curved portion 72. This curved portion 72 in the preferred embodiment creates an angular displacement of approximately 45 degrees in the preferred embodiment between the proximal and distal portions of the sewage removal adapter 54, although the exact angular displacement may vary between approximately 30 to 60 degrees.

Located proximally of at least a substantial portion of the curved portion 72 is a protuberance 74 located on the outside of the sewage removal adapter 54. Located inside the protuberance 74 is a reduced diameter venturi 76 having a larger proximal end and a smaller distal end. The smaller distal end of the reduced diameter venturi 76 is in fluid communication with the interior of the sewage removal adapter 54, and is angled upwardly toward the distal end of the sewage removal adapter 54. In the preferred embodiment, the smaller distal end of the reduced diameter venturi 76 is directed approximately toward the center of the annular connector 60 at the distal end of the sewage removal adapter 54.

The larger proximal end of the reduced diameter venturi 76 is directed generally downwardly. A cylindrical aperture 78 is located in the bottom of the protuberance 74, and is in fluid communication with the larger proximal end of the reduced diameter venturi 76.

A back-flush valve assembly 80 has a hollow cylindrical distal end 82 which is inserted into the cylindrical aperture 78 in the protuberance 74, and is secured adhesively or by other sealing means. The proximal end of the back-flush valve assembly 80 is a connector 84 which, in the preferred embodiment, has female threads inside the interior thereof and which may be connected to the distal end of a standard garden hose (not shown). An elastomeric washer 85 is located inside the connector 84 for sealing purposes. Other types of connectors could also be used without departing from the principles and teachings of the present invention.

Located inside the back-flush valve assembly 80 is a valve element 86, which in the illustration shown in FIG. 6 is a ball valve. Ball valves have an aperture extending diametrically through a rotating ball orthogonal to the axis of rotation. When the aperture in the ball is in fluid communication with the inlet side of the valve and the outlet side of the valve, fluid may flow through the valve. When the aperture is not so aligned, the valve is closed and fluid may not flow therethrough. The valve element 86 is operated by a lever 88, which is fastened to the valve element 86 by a screw 90.

Figure 4:
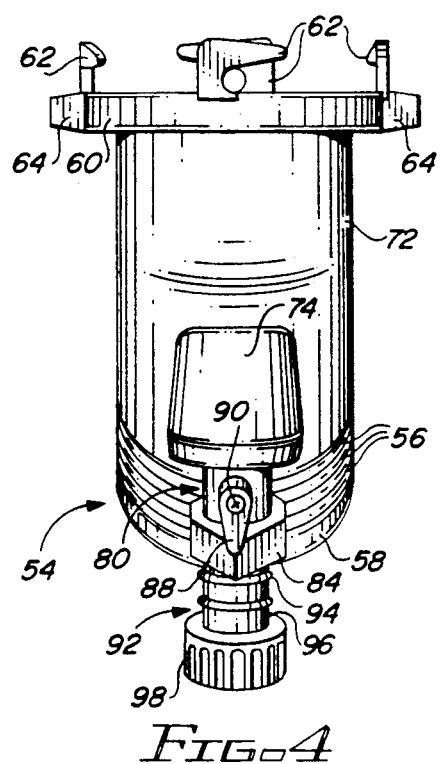
FIG. 4 is a side view of the sewage removal adapter illustrated in FIG. 3 from a different side, also showing the protuberance housing the reduced diameter venturi and the back-flush valve.

Completing the sewage removal adapter 54 as shown in FIGS. 3 and 4 is a swivel assembly 92, which is shown in FIG. 7. The distal end of the swivel assembly 92 is a threaded male connector 94. A tube 96 is sealingly attached in a fixed manner to the distal side of the threaded male connector 94. A threaded female connector 98 is sealingly attached in a rotatable manner to the distal end of the tube 96. An elastomeric washer (not shown) would also be contained inside the threaded female connector 98 for sealing purposes.

A fluid path extends through the swivel assembly 92, and the threaded male connector 94 of the swivel assembly 92 is screwed into the connector 84 of the back-flush valve assembly 80 as shown in FIGS. 3 and 4. In operation, the distal end of a garden hose (not shown), the proximal end of which is connected to a water source, is connected by screwing it into the threaded female connector 98 of the swivel assembly 92. The lever 88 is used to ensure that the valve element 86 in the back-flush valve assembly 80 is initially in its closed position.

The sewage removal adapter 54 is connected onto the annular outlet connector 42 of the main dump outlet connection 40 (FIG. 2) of a recreational vehicle as previously described. The flexible holding tank drain hose (not shown) fastened at one end to the sewage removal adapter 54 is connected at its free end to a dump station inlet (also not shown). The gray-water slider valve 48 and the black-water slider valve 52 may then be operated to alternately drain the gray-water holding tank 36 and the black-water holding tank 38, respectively.

In the event of a blockage, the lever 88 is turned to rotate the valve element 86 in the back-flush valve assembly 80 into its open position. Water will emanate from the distal end of the reduced diameter venturi 76 at a high velocity. The high speed jet of water will travel through the distal end of the sewage removal adapter 54 (the annular connector 60) into the main dump outlet connection 40 (FIG. 2). From there the high speed jet of water quickly displace a blockage, freeing up the flow path of the waste water. The back-flush valve assembly 80 may then be turned off. The operation may be repeated as necessary, or it may be used to back-flush the waste water lines in the recreational vehicle when the gray-water holding tank 3 and the black-water holding tank 38 are both empty.

It may therefore be appreciated from the above detailed description of the preferred embodiment of the present invention that it teaches a sewage removal adapter for easily and conveniently clearing a blockage in the dump lines from the gray-water and black-water holding tanks. The sewage removal adapter of the present invention operates without necessitating either the refilling of the waste water holding tanks, or the removal of the sewage removal adapter from the main dump outlet connection, to clear a blockage in the waste water dump lines. The sewage removal adapter of the present invention is simple to use, and its back-flushing feature is operable by a single individual, without requiring any special skill or substantial muscle strength to operate it.

The sewage removal adapter of the present invention is of durable and long-lasting construction, and requires virtually no maintenance to be provided by the user. The sewage removal adapter of the present invention is of inexpensive construction to allow it to be easily affordable to all recreational vehicle users, including those such as older people who may be on a fixed income. Finally, all of the aforesaid advantages and objectives of the sewage removal adapter of the present invention are achieved without incurring any substantial relative disadvantage.

Although an exemplary embodiment of the present invention has been shown and described, it will be apparent to those having ordinary skill in the art that a number of changes, modifications, or alterations to the invention as described herein may be made, none of which depart from the spirit of the present invention. All such changes, modifications, and alterations should therefore be seen as being within the scope of the present invention.

What is claimed is:

1. A sewage removal adapter for use with a recreational vehicle or the like, comprising:
   a connector for connecting said sewage removal adapter to a source of waste water contained in the recreational vehicle, said connector being located at a distal end of said sewage removal adapter;
   a proximal end of said sewage removal adapter through which waste water entering said sewage removal adapter through said distal end may exit said sewage removal adapter;
   an intermediate portion of said sewage removal adapter located between said connector and said proximal end of said sewage removal adapter, said intermediate portion of said sewage removal adapter including a curved portion therein;
   means for defining a passageway extending between the interior of said intermediate portion of said sewage removal adapter at a distal end of said passageway and a location outside said interior of said sewage removal adapter at a proximal end of said passageway; and
   valve means for selectively providing a fluid flow from a pressurized fluid source to said proximal end of said passageway.

2. A sewage removal adapter as defined in claim 1, wherein said connector comprises:
   an annular connector member having a top or distal side and a bottom or proximal side, said top or distal side of said annular connector member having a plurality of hook members extending therefrom for engagement when said annular connector member is rotated.

3. A sewage removal adapter as defined in claim 2, wherein said top or distal side of said annular connector member has four hook members extending therefrom, said hook members mounted on said annular connector member at ninety degree spaced apart intervals.

4. A sewage removal adapter as defined in claim 2, wherein said connector additionally comprises:
   a cylindrical groove located inside the interior of said annular connector member and facing said top or distal side of said annular connector member; and
   an elastomeric gasket installed in and extending upwardly or distally from said cylindrical groove.

5. A sewage removal adapter as defined in claim 1, wherein the far proximal end of said proximal end of said sewage removal adapter has an inwardly tapered portion located on the outer surface thereof.

6. A sewage removal adapter as defined in claim 5, wherein the portion of said proximal end of said sewage removal adapter immediately distal to said tapered portion is essentially cylindrical and has threads located on the outer diameter thereof.

7. A sewage removal adapter as defined in claim 5, wherein the portion of said proximal end of said sewage removal adapter immediately distal to said tapered portion is essentially cylindrical.

8. A sewage removal adapter as defined in claim 1, wherein said curved portion of said intermediate portion of said sewage removal adapter creates an angular displacement of between approximately 30 to 60 degrees between said connector and said proximal end of said sewage removal adapter.

9. A sewage removal adapter as defined in claim 8, wherein said curved portion of said intermediate portion of said sewage removal adapter creates an angular displacement of approximately 45 degrees between said connector and said proximal end of said sewage removal adapter.

10. A sewage removal adapter as defined in claim 1, wherein said means for defining a passageway comprises:
a protuberance located on the outside of said intermediate portion of said sewage removal adapter.

11. A sewage removal adapter as defined in claim 10, wherein said protuberance is located proximally of at least a substantial portion of said curved portion.

12. A sewage removal adapter for use with a recreational vehicle or the like, comprising:
a) a connector for connecting said sewage removal adapter to a source of waste water contained in the recreational vehicle, said connector being located at a distal end of said sewage removal adapter;
b) a proximal end of said sewage removal adapter through which waste water entering said sewage removal adapter through said distal end may exit said sewage removal adapter;
c) an intermediate portion of said sewage removal adapter located between said connector and said proximal end of said sewage removal adapter, said intermediate portion of sewage removal adapter including a curved portion therein;
d) means for defining a passageway extending between the interior of said intermediate portion of said sewage removal adapter at a distal end of said passageway and a location outside said interior of said sewage removal adapter at a proximal end of said passageway, said distal end of said passageway being oriented toward said distal end of said sewage removal adapter;
e) valve means for selectively providing a fluid flow from a pressurized fluid source to said proximal end of said passageway;
f) wherein said means for defining a passageway comprises a protuberance located on the outside of said intermediate portion of said sewage removal adapter; and
g) wherein said passageway comprises a reduced diameter venturi having a larger proximal end and a smaller distal end, said smaller distal end of said reduced diameter venturi being in fluid communication with said interior of said intermediate portion of said sewage removal adapter.

13. A sewage removal adapter as defined in claim 12, wherein said smaller distal end of said reduced diameter venturi is directed approximately toward the center of said connector at said distal end of said sewage removal adapter, and wherein said larger proximal end of said reduced diameter venturi is directed generally downwardly.

14. A sewage removal adapter as defined in claim 1, wherein said valve means comprises:
a back-flush valve assembly having an inlet and an outlet, said outlet of said back-flush valve being in fluid communication with said proximal end of said passageway, said inlet end of said back-flush valve assembly comprising a female hose connector.

15. A sewage removal adapter as defined in claim 14, wherein said back-flush valve assembly comprises:
a ball valve element have an aperture extending diametrically therethrough which aperture is orthogonal to the axis of rotation of said ball valve element, said ball valve element being rotatable about said axis of rotation between a first position allowing fluid to flow through said back-flush valve assembly and a second position preventing fluid from flowing through said back-flush valve assembly; and
a lever for rotating said ball valve element between said first and second positions.

16. A sewage removal adapter as defined in claim 14, additionally comprising:
a swivel mechanism located between said inlet end of said back-flush valve assembly and said female hose connector.

17. A sewage removal adapter as defined in claim 1, wherein said connector, said proximal end of said sewage removal adapter, and said means for defining a passageway are all molded of plastic material in a unitary segment.

18. A sewage removal adapter for use with a recreational vehicle or the like, comprising:
an annular connector for connecting said sewage removal adapter to a source of waste water contained in the recreational vehicle, said annular connector being located at a distal end of said sewage removal adapter, said annular connector member having a top or distal side, said top or distal side of said annular connector member having a plurality of hook members extending therefrom for engagement when said annular connector is rotated;
a proximal end of said sewage removal adapter through which waste water entering said sewage removal adapter through said distal end may exit said sewage removal adapter, said proximal end of said sewage removal adapter being adapted to receive a flexible holding tank drain hose;
an intermediate portion of said sewage removal adapter located between said annular connector and said proximal end of said sewage removal adapter, said intermediate portion of said sewage removal adapter including a curved portion therein;
a protuberance located on the outside of said intermediate portion of said sewage removal adapter;
a reduced diameter venturi located within said protuberance and extending between the interior of said intermediate portion of said sewage removal adapter at a distal end of said passageway and a location outside said interior of said sewage removal adapter at a proximal end of said passageway, said venturi having a larger diameter proximal end and a smaller diameter distal end, said distal end of said venturi being oriented toward said distal end of said sewage removal adapter; and a back-flush valve assembly having an inlet and an outlet, said outlet of said back-flush valve being in fluid communication with said proximal end of said venturi, said back-flush valve assembly being for selectively providing a fluid flow from a pressurized fluid source to said proximal end of said venturi.

* * * * *